Patented July 5, 1938

2,122,878

UNITED STATES PATENT OFFICE 2,122,878

POLYMERIZATION OF GASES

Morris T. Carpenter, Chicago, Ill., Robert F. Ruthruff, Hammond, Ind., and Joseph K. Roberts, Flossmoor, Ill., assignors to Standard Oil Company, Chicago, Ill., a corporation of Indiana Application March 23, 1936, Serial No. 70,244

19 Claims. (Cl. 196—10)

Our invention consists of an improved process for the polymerization of hydrocarbon gases. It is particularly adapted for the polymerization of gaseous hydrocarbons which are predominantly saturated gases and which may contain a very high content of methane. Casinghead residue gas is of the type which is predominantly saturated and which contains a high content of methane. Due to the recycling features of our process, the charge to the polymerization furnace will contain olefins and the concentration of the olefins in said charge will depend upon the temperature and pressure employed in the coils of the polymerization furnace; in most instances this concentration of olefins will vary from 4 to 14%. In some cases the gas may contain a high percent of olefins, for example, the gases from a cracking process may be used as the feed gas.

It is well known that gaseous hydrocarbons can be polymerized at elevated temperatures and pressures but the processes heretofore employed require a large amount of refrigeration, and compression of gases in order to accomplish the desired results. The compression of gases and refrigeration of the overhead products account for a substantial amount of the cost in operating such processes.

In general, the object of our process is to bring about the polymerization of hydrocarbon gases without resorting to excessive refrigeration and excessive compression of gases. The advantages of our process will be apparent from the following description taken in conjunction with the accompanying drawings.

Figure 1:
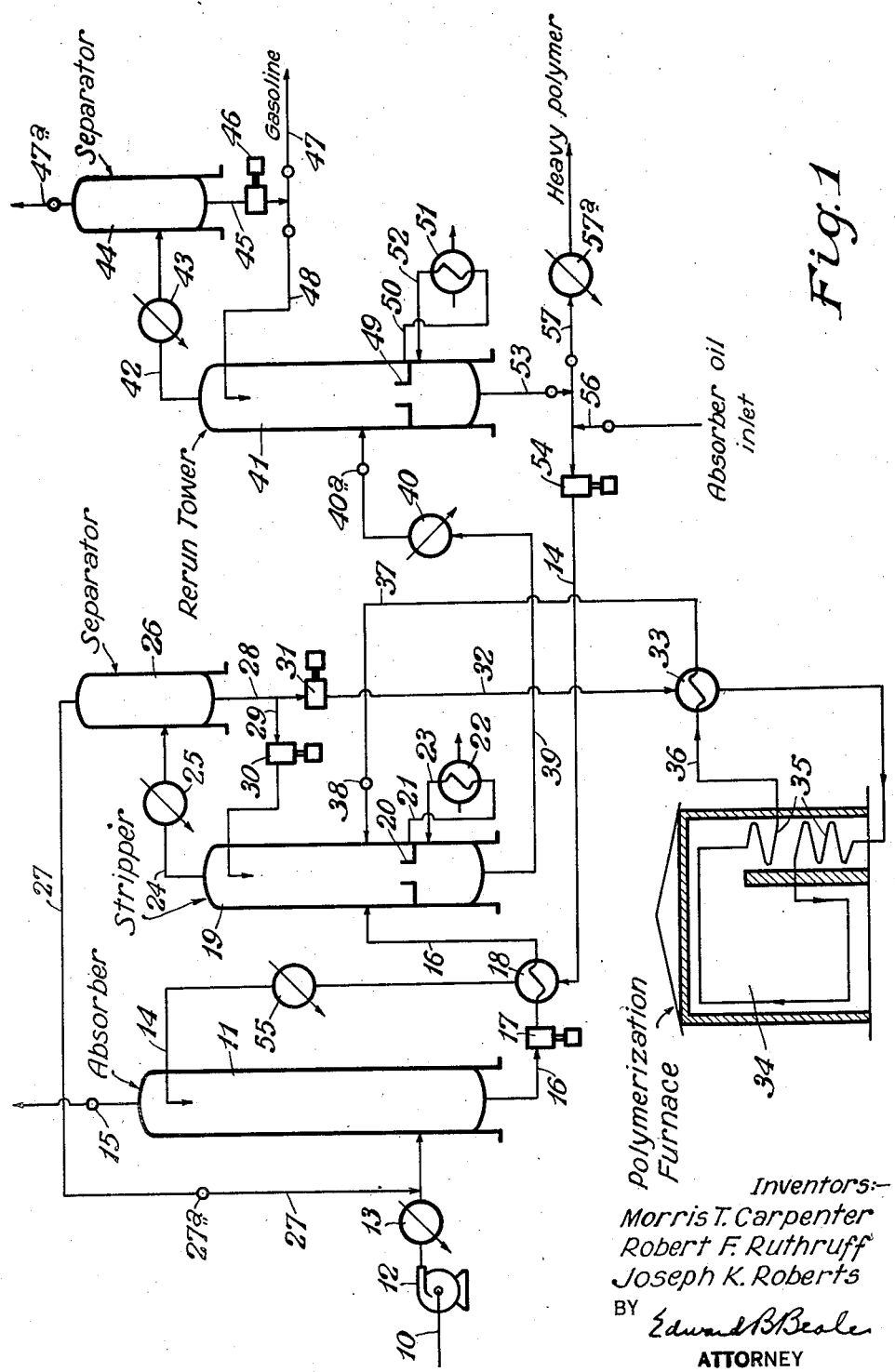
Figure 1 represents diagrammatically, one form of apparatus by which my improved process may be carried out.

Referring to Figure 1, a casinghead residue gas, if available at absorber pressure, is passed through line 10 to the lower part of the absorber 11. If this gas is not available at a pressure at which the absorber 11 is operated, the compressor 12 may be used to bring the gases up to the desired pressure, and in this case, the water cooler 13 is used to reduce the temperature of the gases leaving the compressor 12.

The absorber 11 is operated at a pressure below that of the stripper 19. The pressure relation between the absorber 11 and stripper 19 will be discussed more in detail hereinafter. In the discussion which follows, we will use for an example a pressure of 200 pounds per square inch for the absorber 11 since casinghead gas is sometimes available at this pressure and, as will be shown later, this pressure as well as higher pressures in the absorber 11 eliminate the necessity of any compressors in our process if the raw gas is available at absorber pressure. The lower part of the absorber is maintained at a low temperature generally within the range of 85 to 120° F. and in the example herein discussed, a temperature of 100° F. will be used for the purpose of illustration. If desired, intercoolers may be placed in the absorber 11 to maintain even lower temperatures. The gases which enter the absorber 11 through line 10, pass upward and countercurrent to the absorber oil introduced near the top of the tower through line 14. The unabsorbed gases, comprising mostly methane and small amounts of hydrogen, are vented through valved line 15.

The absorbed gases, comprising mostly hydrocarbons containing from two to four carbon atoms each, and the absorber oil, the solution hereinafter referred to as enriched absorber oil, are removed from the bottom of the absorber through line 16 to the pump 17 where the solution is forced through the heat exchanger 18 and thence to the middle portion of the stripper 19.

The pump 17 raises the pressure on the enriched absorber oil to a pressure of at least 400 pounds per square inch. The pressure at which the stripper 19 operates is always above the pressure maintained in the absorber 11. Our process may be operated by using various pressures in the stripper 19 and the pressure may fall within the range of 400 to 500 pounds per square inch, or higher. Instead of illustrating the operation of the stripper 19 at a high pressure, say around 490 to 510 pounds per square inch, we will use for the purpose of illustration a pressure of 400 pounds per square inch. In any case, however, the stripper 19 is operated at a pressure which is somewhat above the pressure maintained in the absorber 11. The bottom part of the stripper 19 is maintained at an elevated temperature and the specific temperature will depend upon the pressure at which the stripper is operated but generally the temperature will fall within the range of 550 to 700° F.

This temperature is obtained by withdrawing a portion of the liquid from the tray 20 through the line 21 and passing it through the heat exchanger 22 and then returning it to the bottom of the stripper through the line 23. The top part of the stripper is usually maintained at a temperature within the range of 160 to 180° F. and in this example we have employed a temperature of 167° F. The overhead leaving the top part of the stripper through line 24, is passed to the cooler 25 and then to the separator 26. The cooler 25 is operated so that it maintains a temperature of about 100° or lower in the separator 26. If cool water is available, the separator 26 may be operated at temperatures as low as is consistent with the water temperature. In effect, the tower 19 operates as a combined stripper and stabilizer. By maintaining the high pressure in the stripper 19, for example 410 pounds per square inch and a temperature of about 167° F. at the top of the stripper, only water cooling is required by the cooler 25 in order to deliver a substantially liquid product to the separator 26.

The methane, hydrogen and part of the heavier hydrocarbons which are not liquefied in separator 26, are recycled through line 27 and valve 27a to the absorber 11. Most of the methane, hydrogen and about two-thirds of the ethane which are recycled through line 27 will be eliminated through vent 15.

A portion of the liquefied gases in separator 26 is removed through lines 28 and 29 by the pump 30 and returned to the stripper 19 as reflux. Generally this reflux ratio varies from 3:1 to 6:1.

The remaining portion of the liquid removed from the bottom of the separator 26 passes to the pump 31 and thence through line 32, heat exchanger 33 where it is heated to about 500° F., and thence to the polymerization furnace 34 where the products are heated to a temperature within the range of 900 to 1200° F., or, preferably, to a temperature within the range of 980 to 1100° F. The pressure maintained upon the products in the coils 35 of the polymerization furnace, is within the range of 500 to 3000 pounds per square inch and preferably within the range of 800 to 2000 pounds per square inch. The pressure within the heating zone 35 is effected by the pump 31. It should be noted that this high pressure is effected by pumping liquids and without the compression of gases.

The exit gases from the polymerization furnace 34 pass through line 36, heat exchanger 33 which cools the exit gases to a temperature within the range of 500 to 800° F. but preferably to a temperature very close to 500° F., and thence by line 37 to the stripper 19. The pressure reducing valve 38 is employed for the purpose of reducing the pressure of the exit gases from the polymerization zone to the pressure at which the stripper 19 is operated.

In a modified form of our process shown in Figure 1, a portion of the enriched absorber oil removed from the bottom of the absorber 11 may be passed by a line, not shown, to line 36 and used to quench the reaction products leaving the polymerization furnace.

The polymerized products and the absorbing medium are withdrawn from the bottom of the stripper 19 through line 39 to the cooler 40 and thence to the rerun tower 41. The pressure reducing valve 40a, is used in line 39 to reduce the pressure on the products therein before they are introduced into the rerun tower 41. A back pressure regulator is used to maintain the pressure within the rerun tower 41 within the range of 10 to 20 pounds per square inch. The particular temperature and pressure used in the rerun tower 41 will vary according to the composition of the materials treated therein.

The rerun tower 41 is used to separate the gasoline from the absorber oil. Usually the temperature in the lower part of tower 41 is maintained within the range of 400 to 500° F. The hydrocarbon products boiling within the gasoline range are removed from the top of the rerun tower 41 by line 42 and passed to the cooler 43 and thence to the separator 44. The gasoline or hydrocarbons boiling within the gasoline range are removed from the bottom part of the separator 44 through line 45 by pump 46 and thence to storage through valved conduit 47. A safety valve 47a may be used on the top part of separator 44. Some of the polymerized product recovered in the separator 44 is returned through valved line 48 to the rerun tower 41 and used as reflux. By regulating the amount of reflux returned through the line 48 and the temperature of the water cooler 43, the rerun tower can be operated so that only those hydrocarbons boiling within the gasoline range are withdrawn from the top of the rerun tower.

The desired temperature at the base of tower 41 may be obtained by withdrawing a proportion of the product on tray 49 and passing it through line 50 to the heater 51 and thence back to the bottom of the rerun tower through line 52.

The lean absorber oil as well as the heavy polymer produced by the reaction are withdrawn from the bottom of tower 41 through line 53, part being returned as lean absorber oil, by pump 54 and by line 14 to the absorber 11. Some of the heat in this product is removed by the heat exchanger 18. The water cooler 55 reduces the temperature of this recycled product to the temperature desired for the operation of the absorber 11.

To start our process, an absorber oil, such as gas oil and the like, is introduced through the valved line 56. However, after the process has been in operation, the heavy polymer produced by the process may constitute practically all of the absorber oil. The heavy polymer and/or absorber oil may be withdrawn from the system through valved conduit 57 and cooler 57a.

As hereinbefore stated, our process is particularly adapted for the polymerization of gases such as natural gases which are diluted with a large amount of methane. In addition, our process is particularly adapted for the polymerization of olefinic or saturated gases which are diluted with large amounts of methane and/or hydrogen.

The absorber oil used in our process may be of the gas oil type such as gas oils having an A. P. I. gravity ranging from 30 to 40. Also higher hydrocarbon oils may be used as the absorber oil for example, oils having an A. P. I. gravity ranging from 40 to 70; examples of this latter type of oil are, kerosene, heavy naphtha, light naphtha, light polymerized oils produced by our process, and naphthas consisting mostly of hydrocarbons containing about eight carbon atoms. In addition, we may use butane, pentane and hexane or mixtures of these as the absorbing medium. By using a heavy absorber oil in either modification of our process, lower pressure can be used in the absorbers, whereas, by using lighter absorber oils, a higher pressure should be used in the absorbers. We prefer, however, to use the light absorber oils such as those having an A. P. I. gravity ranging from 50 to 75.

To further illustrate the operation of the process hereinbefore described, we will illustrate in a general way, the composition and amounts of the products in various parts of the process. Assume that 1000 cubic feet of gases containing 61.5% methane, 20.7% ethane, 13.4% propane, 2.2% butane and 2.2% isobutane, all on a weight basis, are introduced into the absorber 11. Of this 1000 cubic feet of gas, about 142 cubic feet will be absorbed. The gases recycled from the top of the separator 26 through line 27 will consist principally of hydrogen, methane, ethane, propane and small amounts of heavier hydrocarbons. On the basis of 1000 cubic feet of the initial charge, 250 cubic feet of gas will be returned through line 27 to absorber 11 where about 117 cubic feet will be absorbed and the remainder will be vented through line 15. The approximate composition of this recycled gas in line 27 will be hydrogen 0.2%, methane 13.3%, ethane 34.8% and propane 42%. All of these percentages are on a weight basis. About 67 gallons of absorber oil per 1000 cubic feet of gas introduced into the absorber 11 will be required to effect the above separations. A reduction in the amount of absorber oil recirculated may be effected by increasing the absorber pressure, or lowering the temperature in the absorber or using a lighter absorber oil. The composition of the liquefied products removed from the separator 26 and passed through line 32 to the polymerization furnace 34 will be about as follows: methane 1%, ethane 21.1%, propane 54%, butane 12.7%, all by weight. For each 1000 cubic feet of gases charged to the system through line 10, about one gallon of gasoline will be obtained through the valved conduit 47. From the foregoing description, it is apparent that our process effects the conversion of gaseous hydrocarbons into heavier products boiling within the gasoline range without employing compressors and without the use of refrigeration.

Figure 2:
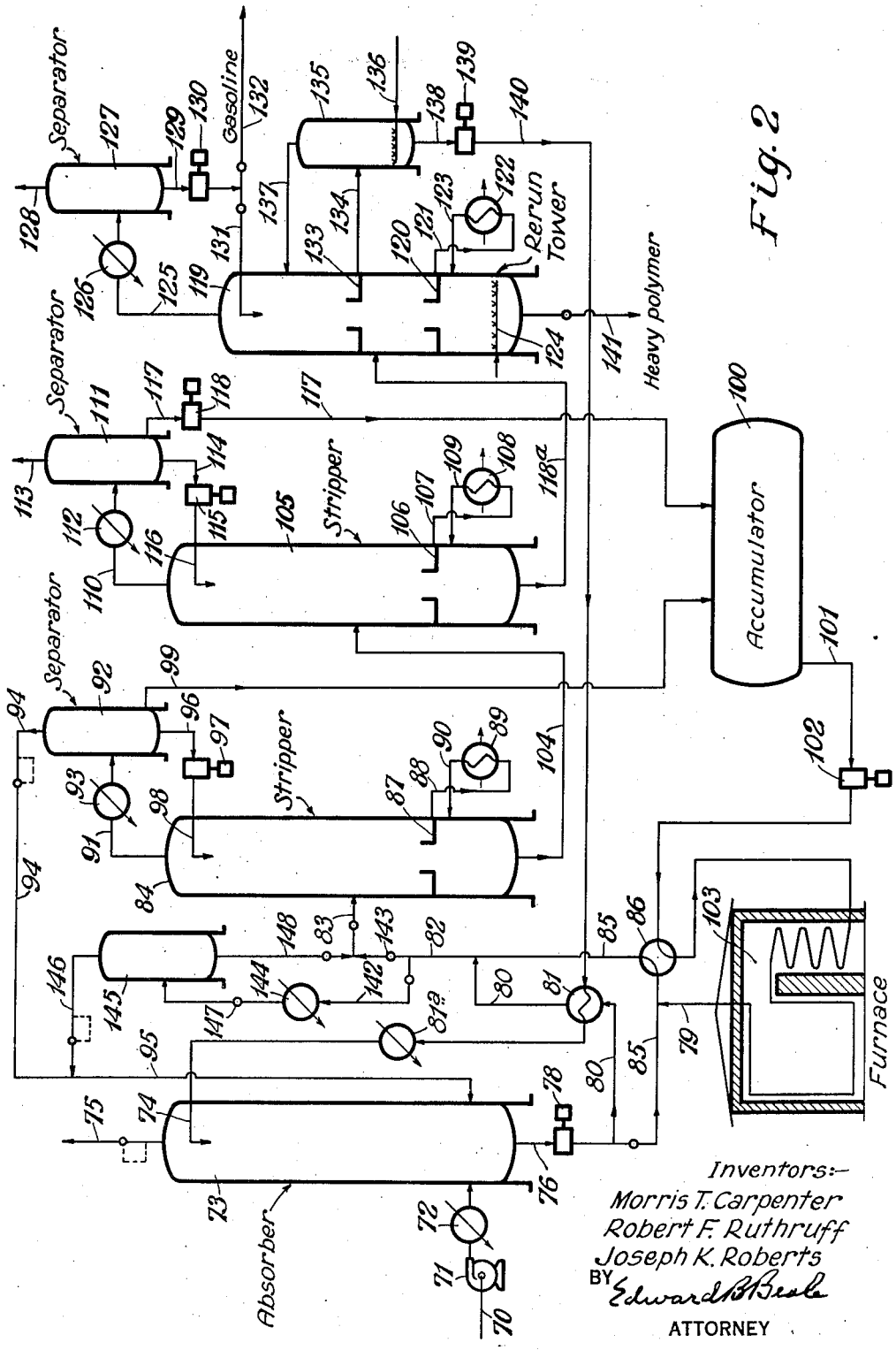
Figure 2 illustrates diagrammatically a modification of our process.

Figure 2 sets forth a modified form of the process hereinbefore described. The temperatures and pressures maintained within the various parts of the system set forth in this modified form of our invention may be the same as those indicated in the description given concerning Figure 1. The gases, preferably casinghead residue gas, are passed through line 70, compressor 71 to the cooler 72 and thence into the lower part of the absorber 73. In this modification of our process, the absorber 73 is operated at a pressure below that of the stripper 84 and it is apparent that the pressure at which the absorber 73 is operated will be determined by the pressure at which the stripper 84 is operated. For the purpose of illustration, we will describe the operation of the absorber 73 at a pressure of about 350 pounds per square inch. Since casinghead residue gases are sometimes available at a pressure around 200 pounds per square inch, it is apparent that very little compression is performed by the compressor 71. In the event that the gases are compressed by the compressor 71, the water cooler 72 will be used to lower the temperature of these compressed gases. It is apparent that if the gases are raised from atmospheric pressure to about 200 pounds per square inch, the load on the cooler 72 will not be very heavy but if the gases are raised to a pressure within the range of 320 to 450 pounds per square inch, the load on the cooler 72 is increased. The bottoms in the absorber are maintained at a low temperature so that a large amount of the feed gases will be absorbed. Generally, the bottoms in the absorber are maintained at a temperature within the range of 60 to 120° F. and in this particular example a temperature of not more than 100° F. will be used for the purpose of illustration. The gases introduced into the lower part of the absorber are contacted with the absorber oil introduced near the top of the absorber through line 74, and the lean gases consisting mostly of methane and small amounts of hydrogen, are vented through the valved conduit 75 which may contain a back pressure regulator. The enriched absorber oil is withdrawn from the bottom of chamber 73 through line 76 by the pump 78 and then may be passed through line 85 to quench the products leaving the polymerization furnace through line 79 and the resulting admixture passed to the heat exchanger 86, or it may be passed through line 80, heat exchanger 81 and mixed with the furnace products in line 82 and thence into the valved conduit 83 where it passes to the stripper 84. In addition, part of the enriched absorber oil in line 76 may be sent through line 85 and used to quench the products in line 79 and the other part of the enriched oil in line 76 may be passed through line 80, and the two streams joined in line 82. If desired, the heat exchanger 81 need not be used in the process. When the enriched absorber oil is passed through line 85 and used to quench the products leaving the furnace through line 79, the heat exchanger 86 will not be operated at a temperature which is as high as it is when the enriched absorber oil is sent through line 80.

The stripper 84 is operated within the range of 400 to 500 pounds per square inch or higher. In all cases, however, the stripper 84 will be operated at a higher pressure than the absorber 73. The bottoms in the stripper are maintained at an elevated temperature, usually within the range of 500 to 700° F. by withdrawing a portion of the liquids therein from the trap-out plate 87 through line 88 and passing them through the heater 89 and thence back to the bottom of the stripper through line 90. The top portion of the stripper is maintained at a temperature such that the hydrocarbons boiling within the gasoline range do not pass over from the top of the stripper. The low boiling hydrocarbons such as methane, ethane, propane and some of the butane, are removed from the top part of the stripper through line 91 and pass to the separator 92. The temperature in separator 92 is maintained at 100° F. or lower. The pressure therein is usually about 10 pounds below the pressure of the stripper 84. The water cooler 93 is used to regulate and maintain the desired temperature in the separator 92. The uncondensed gases are removed from the top of the separator 92 and recycled through the valved conduit 94 to the lower part of the absorber through conduit 95. The pressure in the separator 92 is regulated by a back pressure regulator. Part of the liquefied hydrocarbons in separator 92 is used as reflux in the stripper 84 and is passed through line 96 by pump 97 and introduced into the top part of the stripper through conduit 98.

Since two towers are used in this modification of our invention to separate the gasoline products from the recycled stock, the fractionation in the first tower 84 between butane and pentane need not be as sharp as in tower 19 described in the first form of our invention, i. e. pentane ($C_5$) must not go overhead through line 91 but more butane ($C_4$) and lighter hydrocarbons may remain in the bottoms of tower 84 and pass therefrom through line 104, and hence the amount of reflux introduced into tower 84 through line 98 may vary from one-half to one and one-half parts of liquid hydrocarbons for each part of liquid hydrocarbon withdrawn from the separator 92 through line 99.

A portion of the liquefied gases in separator 92 is removed through line 99 and passed to the accumulator tank 100. The liquefied gases in tank 100 are removed through line 101 by pump 102 and passed to the heat exchanger 86 and thence to the polymerization furnace 103. The exit gases, or polymerized products from the furnace 103, pass through conduit 79 and thence to the stripper 84. As previously described, the polymerized products and materials leaving the polymerization coils by line 79 may be quenched with the enriched absorber oil removed from the bottom of the absorber 73 by lines 76 and 85. Alternatively, the products leaving the furnace through 79 and 85 may be mixed with the enriched absorber oil removed from the absorber through lines 76 and 80. The high temperatures and pressures maintained in the coils of the polymerization furnace are the same as those described in the first embodiment of our invention and illustrated by Figure 1. Generally, the polymerization is performed at a temperature ranging from 980 to 1100° F. and a pressure ranging from 800 to 2000 pounds per square inch. This pressure is obtained by the pump 102 which acts on the liquids from tank 100; the compression of gases being avoided.

The products from the bottom part of the stripper 84, consisting mostly of absorber oil, polymers and low boiling gases, pass through line 104 to the second stripping tower 105. Stripper 105 is usually operated at a pressure within the range of 60 to 250 pounds per square inch; the exact pressure, however, being such that all of the overhead products passed to the separator 111 can be condensed without the use of cooling other than water cooling. It should also be understood that the particular pressure required for total condensation of the overhead from tower 105 can be varied by changing the temperature and/or pressure in stripper 84.

The temperature in the bottom part of stripper 105 is maintained within the range of 400 to 600° F., depending upon the pressure employed. This temperature is effected by withdrawing a part of the products therefrom from the trap-out plate 106 through line 107 and passing them through the heater 108 and thence through line 109 back to the bottom part of the stripper. The gases are removed from the top part of the stripper 105 by line 110 and pass to the separator 111. The pressure in separator 111 is usually about 10 to 15 pounds below the pressure in the stripper 105. By aid of the cooler 112 and a high pressure, substantially all of the products which enter separator 111 are liquefied. In the event that some gases are not liquefied, they may be vented through line 113. A portion of the liquefied gases from separator 111 are passed through line 114 by the pump 115 and introduced into the top part of the stripper by line 116 as reflux. In tower 105 a reflux ratio of about 5:1 will be used to obtain a sharp fractionation between butane and pentane. It should be noted that since most of the butane will be taken overhead in tower 84, using about a 1:1 reflux ratio, that the total cooling required in the overhead condensers for towers 84 and 105 will be considerably less than that required in tower 19 of our process shown in Figure 1.

The liquefied material in separator 111 which is not employed as reflux is passed through line 117 by the pump 118 to the accumulator 100. As previously described, the liquefied products in accumulator 100 are passed through line 101 by the pump 102 to the heating coils of the polymerization furnace 103.

The products removed from the bottom of the stripper 105, comprising essentially absorber oil and the polymerized products, are passed through line 118a to the center part of the rerun tower 119 where the hydrocarbons boiling within the gasoline range are separated from the heavier polymers and the absorber oil.

The rerun tower 119 may be operated at the same temperature and pressure as the rerun tower 41 shown in Figure 1. For example, the rerun tower 119 may be operated at a pressure about 10 pounds per square inch and the bottoms in the lower part of the tower are usually maintained at a temperature within the range of 400 to 500° F. but preferably at a temperature of about 450° F. The particular temperature and pressure used in the rerun tower 119 will vary according to the composition of the materials therein and the vapor pressure of the gasoline desired.

This temperature in the lower part of the rerun tower may be effected by withdrawing liquid products from the tray 120 through line 121 and passing it through the heater 122 and thence back to the bottom of the tower through line 123. In addition, steam may be introduced into the bottom of the tower through line 124 in order to aid in the separation of the gasoline from the heavy polymers and absorber oil. The products taken from the top of tower 119 are passed through line 125 to the cooler 126 and thence into the separator 127. Practically all of the products which enter the separator 127 liquefy, however, if a small amount of gas should be present, it may be vented through line 128. A portion of the gasoline in separator 127 may be withdrawn through line 129 by the pump 130 and returned through the valved conduit 131 as reflux for the rerun tower. The remaining portion of the liquefied products in separator 127 are withdrawn through valved conduit 132 as finished product.

Absorber oil is obtained as a side cut from the rerun tower 119, being trapped out by the trap 133 and passed by the line 134 to the stripper 135. Steam is introduced into the bottom part of the stripper 135 through line 136 which strips from the absorber oil all of the volatile constituents which may tend to increase the vapor pressure of the lean oil. These hydrocarbons are returned to the rerun tower 119 by conduit 137.

The lean absorber oil is withdrawn from the bottom of the stripper 135 through conduit 138 and forced by the pump 139 through line 140 back to the absorber 73. A portion of the heat in this recycled absorber oil is taken out by the heat exchanger 81 and another portion of the heat, sufficient to reduce the temperature of the absorber oil to about 100° F. or lower, is taken out by the cooler 81a.

The heavy polymers produced by the process are withdrawn from the bottom of the rerun tower 119 through valved conduit 141.

The processes described hereinbefore and illustrated by Figures 1 and 2, may be modified by placing an enlarged reaction zone in the lines which take the reaction products from the polymerization furnace. In Figure 1, this enlarged reaction chamber would be placed in line 36 before the heat exchanger 33. In Figure 2, this enlarged reaction zone would be placed in line 79 before the heat exchanger 86. We would employ the same reaction chamber that is shown in our copending application No. 680,776, filed July 17, 1933, of which the present application is a continuation in part. This application is now United States Patent No. 2,035,409.

As a further modification of our process described with reference to Figure 2, the reaction products in line 82 may be passed through valved conduit 142, by closing the valve 143, to the cooler 144 where the products are cooled to a low temperature. These cooled products then pass to the separator 145 where flash vapors are removed through valved conduit 146 and returned to the absorber through line 95. The pressure reducing valve 147 is used to reduce the pressure of the products in line 142 before they enter the separator 145. The pressure within the separator 145 is usually maintained at a point above the pressure maintained in the stripper 84, up to a pressure equal to full furnace outlet pressure. The flash liquid is withdrawn from the bottom part of the separator 145 and passed through line 148 to line 83 and thence to the stripper 84. The flash chamber 145 reduces the load on the stripper 84 and coolers 93 and 112 but tends to increase the load on the absorber 73. It is apparent that the separator 145 may be operated at a variety of temperatures and pressures so as to vary the load on the absorber 73 and stripper 84. It is also obvious that any decrease of the load on stripper 84 will also tend to reduce the load on the other fractionating equipment in the system.

In the foregoing discussion of our invention, as illustrated in Figures 1 and 2, we have set forth specific operating conditions and in some cases given preferred ranges of operating conditions such as temperature and pressure. It should be understood that our process may be operated by those skilled in the art at different temperatures and pressures from those herein mentioned. It is also apparent that modifications of our process will be evident to those skilled in the art and in particular with respect to the details relating to the use of back pressure regulators, heat exchangers and construction of the polymerization furnaces. For example, the heaters or reboilers 22, 51, 89, 108 and 122 may be heated by any convenient and economical means. We do not limit ourselves to the details and specific conditions herein described except as defined by the following claims.

We claim:

1. In a process for converting hydrocarbon gases which are normally gaseous at atmospheric pressure and temperature into normally liquid hydrocarbon materials, the steps comprising scrubbing normally gaseous hydrocarbons at elevated pressure with a hydrocarbon oil, eliminating undissolved gases from the system, separating dissolved gases from said hydrocarbon oil by heating the same at a pressure higher than the pressure at which they are absorbed in said hydrocarbon oil, liquefying a part of said separated gases by cooling, polymerizing said liquefied gases into liquid products at temperatures of 900–1200° F. and under pressures of 500–3000 pounds per square inch, mixing with the hot polymerized reaction products a portion of the enriched hydrocarbon absorber oil produced by scrubbing normally gaseous hydrocarbons with the hydrocarbon oil, passing the admixture into a separating zone, and separating the liquid products from unreacted gases.

2. In a process for converting normally gaseous hydrocarbons into normally liquid hydrocarbon materials, the steps comprising scrubbing said gases in a scrubbing zone at elevated pressure with a hydrocarbon absorber oil to obtain an enriched absorber oil, eliminating undissolved gases from the system, passing the enriched absorber oil to a stripping zone and separating dissolved gases from the enriched absorber oil by heating the same at a pressure higher than the pressure at which the gases were absorbed in the oil and such that a substantial portion of the gases will liquefy at a temperature within the range of 60 to 120° F., liquefying a part of said separated gases by water cooling, polymerizing said liquefied gases into normally liquid hydrocarbon materials in a heating zone at elevated temperatures and pressures, passing the polymerized products from said heating zone into the stripping zone, and subsequently separating normally liquid hydrocarbon materials from the hydrocarbon absorber oil and heavier hydrocarbon materials.

3. In a process for converting normally gaseous hydrocarbons into normally liquid hydrocarbon materials boiling within the gasoline range, the steps comprising contacting said gases in a scrubbing zone at elevated pressures with a hydrocarbon absorber oil to obtain an enriched absorber oil, eliminating undissolved gases from the system, separating dissolved gases from said enriched absorber oil in a stripping zone by heating the enriched absorber oil while maintained at a pressure higher than the pressure at which the gases were absorbed and at a pressure of at least 400 pounds per square inch, liquefying a part of said separated gases by cooling, polymerizing said liquefied gases into normally liquid hydrocarbon materials in a heating zone at temperatures of 900–1200° F. and under pressures of 500–3000 pounds per square inch, passing the products from said heating zone into the stripping zone, recycling a part of the gases separated in said stripping zone to the lower part of the scrubbing zone, withdrawing the liquid products from the lower part of said stripping zone, and separating therefrom normally liquid hydrocarbon materials which boil within the gasoline range.

4. In a process for converting normally gaseous hydrocarbons into liquid hydrocarbon materials boiling within the gasoline range, the steps comprising contacting said gases in a scrubbing zone at elevated pressure with a light hydrocarbon absorber oil to obtain an enriched absorber oil, eliminating undissolved gases from the system, separating dissolved gases from said enriched absorber oil in a stripping zone by heating the enriched absorber oil while maintained at a pressure higher than the pressure at which the gases were absorbed and at a pressure of at least 400 pounds per square inch, withdrawing the gases from said stripping zone and liquefying a part of them by cooling and recycling the uncondensed portion of said gases to the lower part of the scrubbing zone for further contact with the hydrocarbon absorber oil, polymerizing the liquefied gases into liquid hydrocarbon materials boiling within the gasoline range at elevated temperatures and pressures and passing the polymerized reaction products into the stripping zone, withdrawing the liquid products from the lower part of said stripping zone and passing them to a second zone where the normally liquid hydrocarbon materials boiling within the gasoline range are separated from the hydrocarbon oil used as an absorbing medium.

5. In a process for converting hydrocarbon gases which are normally gaseous at atmospheric pressure and temperature into normally liquid hydrocarbons boiling within the gasoline range, the steps comprising scrubbing said gases at elevated pressure with a hydrocarbon oil of the gas oil type to form an enriched absorber oil, eliminating undissolved gases from the system, separating dissolved gases from said enriched absorber oil by heating the enriched absorber oil while maintained at a pressure higher than the pressure at which the gases were absorbed by said hydrocarbon oil, liquefying a substantial part of said separated gases while under the higher pressure by cooling, polymerizing said liquefied gases into liquid hydrocarbon products at temperatures of 900–1200° F. and under pressure of 500–3000 lbs. per square inch, mixing the hot polymerized reaction products with a portion of the enriched absorber oil, passing the admixture into a separating zone and separating liquid products from unreacted gases.

6. In a process for converting hydrocarbon gases which are normally gaseous at atmospheric pressure and temperature into normally liquid hydrocarbons boiling within the gasoline range, the steps comprising scrubbing said gases at elevated pressure with a hydrocarbon oil to form an enriched absorber oil, eliminating undissolved gases from the system, passing the enriched absorber oil to a stripping zone and separating dissolved gases from said enriched absorber oil by heating the same while maintained at a pressure higher than the pressure at which the gases were absorbed in said hydrocarbon oil, liquefying a substantial part of said separated gases while under the higher pressure by cooling, polymerizing said liquefied gases into liquid hydrocarbons boiling within the gasoline range at temperatures of 900–1200° F. and under pressures of 500–3000 lbs. per square inch, mixing the hot polymerized reaction products with a portion of the enriched absorber oil, passing the admixture into said stripping zone and separating liquid hydrocarbon products from unreacted gases.

7. In a process for converting normally gaseous hydrocarbons into normally liquid hydrocarbons boiling within the gasoline range, the steps comprising scrubbing normally gaseous hydrocarbons at an elevated pressure with a hydrocarbon oil to form an enriched absorber oil, eliminating undissolved gases from the system, passing the enriched absorber oil into a stripping zone and separating dissolved gases from said enriched oil by heating the same while maintained at a pressure higher than the pressure at which the gases were absorbed in said hydrocarbon oil, liquefying a substantial part of said separated gases while under the higher pressure by cooling, polymerizing said liquefied gases in a heating zone at temperatures of 900–1200° F. and under pressures of 500–3000 pounds per square inch into normally liquid hydrocarbons boiling within the gasoline range, mixing the hot reaction products from the heating zone with a portion of the enriched absorber oil, passing the admixture into the stripping zone and separating unreacted gases from the liquid hydrocarbon products.

8. In a process for converting normally gaseous hydrocarbons into normally liquid hydrocarbons boiling within the gasoline range, the steps comprising scrubbing normally gaseous hydrocarbons at an elevated pressure with a hydrocarbon oil to form an enriched absorber oil, eliminating undissolved gases from the system, passing the enriched absorber oil into a stripping zone and separating dissolved gases from said enriched oil by heating the same while maintained at a pressure higher than the pressure at which the gases were absorbed in said hydrocarbon oil, liquefying a substantial part of said separated gases while under the higher pressure by cooling, polymerizing said liquefied gases in a heating zone at temperatures of 900–1200° F. and under pressures of 500–3000 pounds per square inch into normally liquid hydrocarbon products boiling within the gasoline range, mixing the hot reaction products from the heating zone with a portion of the enriched absorber oil, passing the admixture into the stripping zone and withdrawing unreacted gases from the top of said stripper, withdrawing the liquid products from the lower part of said stripping zone and separating therefrom normally liquid hydrocarbons boiling within the gasoline range.

9. In a process for converting hydrocarbon gases which are normally gaseous at atmospheric pressure and temperature into normally liquid hydrocarbons, the steps comprising scrubbing normally gaseous hydrocarbons at an elevated pressure with a hydrocarbon oil to form an enriched absorber oil, eliminating undissolved gases from the system, separating the dissolved gases from the enriched absorber oil in a stripping zone by heating the enriched absorber oil while maintained at a pressure higher than the pressure at which said gases were absorbed, liquefying a substantial part of said separated gases while under elevated pressure by cooling, polymerizing said liquefied gases in a heating zone into liquid hydrocarbons at elevated temperatures of 900–1200° F. and under pressures of 500–3000 pounds per square inch, passing the reaction products from the heating zone into said stripping zone, withdrawing the liquid products from the lower part of said stripping zone and separating therefrom the polymerized normally liquid hydrocarbons.

10. In a process for converting normally gaseous hydrocarbons into normally liquid hydrocarbon materials boiling within the gasoline range, the steps comprising contacting normally gaseous hydrocarbons in a scrubbing zone at an elevated pressure with a hydrocarbon oil to obtain an enriched absorber oil, eliminating undissolved gases from the system, separating dissolved gases from said enriched absorber oil in a stripping zone by heating the enriched absorber oil while maintained at a pressure higher than the pressure at which the gases were absorbed and at a pressure of at least 400 pounds per square inch, liquefying a part of said separated gases while under a pressure of at least 400 pounds per sq. in. by cooling, polymerizing said liquefied gases in a heating zone at temperatures of 900–1200° F. and under pressures of 500–3000 pounds per sq. in. into normally liquid hydrocarbon materials boiling within the gasoline range, passing the products from said heating zone into said stripping zone, withdrawing the liquid products from the lower part of said stripping zone and separating therefrom normally liquid hydrocarbon materials boiling within the gasoline range.

11. In a process for converting hydrocarbon gases which are normally gaseous at atmospheric pressure and temperature into liquid hydrocarbons boiling within the gasoline range, the steps comprising scrubbing said gases with a hydrocarbon oil to form an enriched absorber oil, eliminating undissolved gases from the system, passing the enriched absorber oil into a stripping zone and separating dissolved gases from said enriched absorber oil by heating the same while maintained at a pressure sufficiently high to cause a portion of the stripped gases to condense when cooled to a temperature of 100° F., liquefying a substantial part of said separated gases while under the high pressure by cooling, polymerizing said liquefied gases in a reaction zone at elevated temperatures and pressures into liquid hydrocarbon products, mixing the hot reaction products from the reaction zone with a portion of the enriched absorber oil, passing the admixture into said stripping zone and separating unreacted gases from liquid hydrocarbon products, withdrawing said liquid hydrocarbon products from the stripping zone and separating therefrom liquid hydrocarbons boiling within the gasoline range.

12. In a process for converting hydrocarbon gases which are normally gaseous at atmospheric temperature and pressure into normally liquid hydrocarbons boiling within the gasoline range, the steps comprising scrubbing hydrocarbon gases containing methane at an elevated pressure with a hydrocarbon oil to form an enriched absorber oil, eliminating undissolved gases and methane from the system, passing the enriched absorber oil to a stripping zone and separating dissolved gases from said enriched absorber oil by heating the same while maintained at a pressure higher than the pressure at which the gases were absorbed in said hydrocarbon oil, liquefying a substantial part of said separated gases while under the higher pressure by cooling, polymerizing said liquefied gases in a reaction zone at elevated temperatures and pressures into liquid hydrocarbons, mixing the hot reaction products from the reaction zone with a portion of the enriched absorber oil, passing the admixture into said stripping zone and separating unreacted gases from liquid hydrocarbon products, withdrawing said liquid hydrocarbon products from the stripping zone and separating therefrom liquid hydrocarbons boiling within the gasoline range.

13. In a process for converting hydrocarbon gases which are normally gaseous at atmospheric temperature and pressure into normally liquid hydrocarbons boiling within the gasoline range, the steps comprising scrubbing hydrocarbon gases containing methane at an elevated pressure with a hydrocarbon oil to form an enriched absorber oil, eliminating undissolved gases and methane from the system, passing the enriched absorber oil to a stripping zone and separating dissolved gases from said enriched absorber oil by heating the same while maintained at a pressure that is above about 400 pounds per square inch and higher than the pressure at which the gases were absorbed in said hydrocarbon oil, liquefying a substantial part of said separated gases while under the higher pressure by cooling to a temperature below 100° F., polymerizing said liquefied gases in a reaction zone at elevated temperatures and pressures into liquid hydrocarbons, mixing the hot reaction products from the reaction zone with a portion of the enriched absorber oil, passing the admixture into said stripping zone and separating liquid hydrocarbon products from unreacted gases, withdrawing said liquid hydrocarbon products from the stripping zone and separating therefrom liquid hydrocarbons boiling within the gasoline range.

14. In the process for converting hydrocarbon gases which are normally gaseous at atmospheric temperature and pressure into liquid hydrocarbon products boiling within the gasoline range, the steps comprising scrubbing a dilute olefinic gas containing hydrogen and methane with a hydrocarbon oil to form an enriched absorber oil, eliminating hydrogen, methane and undissolved gases from the system, passing the enriched absorber oil to a stripping zone and separating dissolved gases from the enriched absorber oil by heating the same at an elevated pressure, liquefying a part of said separated gases while maintained under an elevated pressure by cooling, polymerizing said liquefied gases into normally liquid hydrocarbon products in a heating zone at elevated temperatures and pressures, passing the polymerized products from said heating zone into the stripping zone, and separating unreacted gases from normally liquid hydrocarbon materials, withdrawing the normally liquid hydrocarbon materials from said stripping zone and separating therefrom liquid hydrocarbon products boiling within the gasoline range.

15. In the process for converting hydrocarbon gases which are normally gaseous at atmospheric pressure and temperature into normally liquid hydrocarbons boiling within the gasoline range, the steps comprising scrubbing normally gaseous hydrocarbons with a hydrocarbon oil to form an enriched absorber oil, eliminating undissolved gases from the system, passing the enriched absorber oil into a stripping zone and separating the dissolved gases from the absorber oil, polymerizing the gases separated from the absorber oil into liquid hydrocarbon products by heating the same in a reaction zone to a temperature within the range of 900–1200° F. while maintained at a pressure within the range of 500–3000 lbs. per square inch, passing the hot reaction products from the reaction zone into said stripping zone and separating unreacted gases from liquid hydrocarbon materials, withdrawing the normally liquid hydrocarbon materials from said stripping zone and separating therefrom liquid hydrocarbon products boiling within the gasoline range.

16. The process according to claim 8 wherein the admixture of hot reaction products and enriched absorber oil are passed in heat exchange relation with the liquefied gases entering the heating zone before said admixture is passed into the stripping zone.

17. The process according to claim 10 wherein the products from the heating zone are passed in heat exchange relation with the liquefied gases entering the heating zone before said products from the heating zone are introduced into the stripping zone.

18. The process according to claim 2 wherein the polymerized products from the heating zone are passed in heat exchange relation with the liquefied gases entering the heating zone prior to passing the polymerized products from the heating zone into the stripping zone.

19. The process according to claim 15 wherein the hot reaction products from the reaction zone are passed in heat exchange relation with the gases entering the reaction zone prior to passing said hot reaction products to the stripping zone.

MORRIS T. CARPENTER.
ROBERT F. RUTHRUFF.
JOSEPH K. ROBERTS.

DISCLAIMER 2,122,878.—*Morris T. Carpenter*, Chicago, Ill., *Robert F. Ruthruff*, Hammond, Ind., and *Joseph K. Roberts*, Flossmoor, Ill. POLYMERIZATION OF GASES. Patent dated July 5, 1938. Disclaimer filed August 25, 1939, by the assignee, *Standard Oil Company (Indiana)*.

Hereby enters this disclaimer to, but only to, those claims appended to said specification which are numbered 1, 5, 6, 7, 8, 9, 12, 14, and 15.

[*Official Gazette September 19, 1939.*]